United States Patent
Sawayanagi et al.

(10) Patent No.: US 7,945,588 B2
(45) Date of Patent: May 17, 2011

(54) IMAGE FORMING APPARATUS CONTROLLING USE OF MEDIUM INSERTED THEREINTO

(75) Inventors: Kazumi Sawayanagi, Itami (JP); Hironobu Nakata, Itami (JP); Hiroyuki Kawabata, Kawanishi (JP); Toshihiko Otake, Ikeda (JP); Yoshiki Tokimoto, Nishiwaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 456 days.

(21) Appl. No.: 12/053,177

(22) Filed: Mar. 21, 2008

(65) Prior Publication Data
US 2008/0281837 A1  Nov. 13, 2008

(30) Foreign Application Priority Data
May 10, 2007  (JP) .................... 2007-125624

(51) Int. Cl.
*G06F 7/00* (2006.01)
*G06F 17/30* (2006.01)
(52) U.S. Cl. ..................... 707/795; 707/802
(58) Field of Classification Search ............ 707/795
See application file for complete search history.

(56) References Cited

U.S. PATENT DOCUMENTS

| | | | |
|---|---|---|---|
| 6,515,946 B1 * | 2/2003 | Morisaki .................... 369/30.55 |
| 6,917,570 B2 * | 7/2005 | Morisaki .................... 369/30.55 |
| 7,089,593 B1 * | 8/2006 | Dono et al. ...................... 726/26 |
| 7,356,704 B2 * | 4/2008 | Rinkevich et al. ............ 713/183 |
| 7,594,603 B2 * | 9/2009 | Tran .............................. 235/380 |
| 7,620,667 B2 * | 11/2009 | Rollin et al. ......................... 1/1 |
| 2005/0149745 A1 * | 7/2005 | Ishidoshiro ................... 713/189 |
| 2005/0160068 A1 | 7/2005 | Sakaguchi |
| 2006/0089919 A1 * | 4/2006 | Kidd et al. ....................... 705/75 |
| 2007/0053529 A1 * | 3/2007 | Suyama et al. ............... 381/119 |

FOREIGN PATENT DOCUMENTS

| | | |
|---|---|---|
| JP | 5095453 | 4/1993 |
| JP | 11-174920 | 7/1999 |
| JP | 2002-236574 | 8/2002 |
| JP | 2005-193411 | 7/2005 |
| JP | 2005-324431 | 11/2005 |
| JP | 2006-76034 | 3/2006 |

OTHER PUBLICATIONS

Japanese Office Action, mailed Apr. 21, 2009, directed to a related Foreign Application JP 2007-125624; (6 pages).

* cited by examiner

*Primary Examiner* — Don Wong
*Assistant Examiner* — Binh V Ho
(74) *Attorney, Agent, or Firm* — Morrison & Foerster LLP (57) ABSTRACT

When a user logs in to an MFP and inserts a medium, a serial number of the medium is stored in a device information database in correspondence with user information of the user, and a descramble key, e.g., a hash code of the serial number is registered in the user information. When the medium is removed from the MFP which is still logged in, the registration is deleted. When the MFP into which the medium is still inserted is logged out, no registration is deleted. When the user logs in to the MFP into which the medium is already inserted, the MFP determines whether a descramble key is registered in user information of the user. When a second user logs in to an MFP from which a first user had logged out while forgetting to remove a medium, the MFP prohibits the second user from accessing the medium because no descramble key is registered in user information of the second user.

8 Claims, 7 Drawing Sheets

IMAGE FORMING APPARATUS CONTROLLING USE OF MEDIUM INSERTED THEREINTO

This application is based on Japanese Patent Application No. 2007-125624 filed with the Japan Patent Office on May 10, 2007, the entire content of which is hereby incorporated by reference.

BACKGROUND OF THE INVENTION

1. Field of the Invention

The present invention relates to an image forming apparatus, a method of controlling a medium in the image forming apparatus, and a computer readable medium recording thereon a medium control program. In particular, the present invention relates to an image forming apparatus into and from which a medium can be inserted and removed, a method of controlling the medium in the image forming apparatus, and a computer readable medium recording thereon a medium control program.

2. Description of the Related Art

An image forming apparatus such as an MFP (Multi Function Peripheral) is used as follows. That is, a medium such as a USB (Universal Serial Bus) memory is inserted into the image forming apparatus. Then, data in the medium is outputted through the image forming apparatus or image data obtained by scanning is written to the medium.

In a case where an MFP is shared between a plurality of users in an office environment, if a user leaves the MFP while inserting a medium thereof into the MFP, another user may acquire data in the medium inserted into the MFP. As a result, there is a possibility of data leakage.

In order to avoid such a disadvantage, various propositions have been made. For example, Japanese Laid-Open Patent Publication No. 2002-236574 discloses an image forming apparatus. According to the image forming apparatus, a predetermined range around the apparatus is preset. If a user goes out of the predetermined range, that is, if the user leaves the apparatus, the apparatus detects the fact to display a warning for urging the user to remove a medium. Further, Japanese Laid-Open Patent Publication No. 2005-324431 discloses an image processing apparatus making a notification so as to cause a user to remove a medium during a period from readout of a file from the medium to completion of print processing. Further, Japanese Laid-Open Patent Publication No. 11-174920 discloses a digital copying machine. According to the digital copying machine, a reference time is preset. If a time during which a medium is inserted into the machine exceeds the reference time, the machine displays a warning and temporarily prohibits use of the medium. Similarly, Japanese Laid-Open Patent Publication No. 2006-076034 discloses an image forming apparatus. This image forming apparatus, which is not operated for a preset time, invalidates an authentication state of a medium to prohibit use of the medium.

However, the invention disclosed in each of Japanese Laid-Open Patent Publication Nos. 2002-236574 and 2005-324431 is devised for preventing the user from forgetting to remove the medium from the apparatus. Consequently, there is a problem that this technique cannot prevent leakage of data from the medium inserted into the apparatus.

In addition, the invention disclosed in each of Japanese Laid-Open Patent Publication Nos. 11-174920 and 2006-076034 disadvantageously prohibits use of the medium in an undesirable situation depending on usage by the user. Consequently, there is a problem that usability of the apparatus becomes deteriorated in some cases. Further, an authorized user who intends to use the medium, the use of which is prohibited, must perform an authorizing operation again. Consequently, there is a problem that the apparatus requires complicated control and operation.

SUMMARY OF THE INVENTION

The present invention is devised in view of the aforementioned problems. An object of the present invention is to provide an image forming apparatus, a method of controlling a medium in the image forming apparatus, and a computer readable medium recording thereon a medium control program, each capable of appropriately preventing an unauthorized user from using the medium inserted into the image forming apparatus without complicated operation.

In order to accomplish this object, according to one aspect of the present invention, an image forming apparatus includes: a read unit to read unique information from a medium inserted into the image forming apparatus; a first storing unit to store the unique information of the medium in a first storage area; a first determination unit to determine whether or not the unique information of the medium is stored in the first storage area in a state where a user has logged in to the image forming apparatus and the medium is inserted into the image forming apparatus; a second storing unit to store identification information of the medium, which is obtained from the unique information of the medium, in a second storage area while bringing the identification information into correspondence with information about the user who logs in to the image information apparatus, in response to a result of the determination by the first determination unit; a second determination unit to determine whether or not the identification information of the medium is stored in the second storage area while being brought into correspondence with the information about the user who logs in to the image forming apparatus, in a case where the first determination unit determines that the unique information of the medium is stored in the first storage area; and a control unit to control permission/prohibition of use of a function requiring access to the medium among functions of the image forming apparatus, in response to a result of the determination by the second determination unit.

Preferably, the image forming apparatus further includes: a detection unit to detect a change in an insertion status of the medium into the image forming apparatus; and a third determination unit to determine one of a first state where the user has logged in to the image forming apparatus at a time when the medium is inserted into the image forming apparatus and a second state where the medium has been inserted into the image forming apparatus at a time when the user logs in to the image forming apparatus, on the basis of the change in the insertion status of the medium and a log-in status of the user to the image forming apparatus. Herein, the first determination unit determines whether or not the unique information of the medium is stored in the first storage area in a case where the third determination unit determines that the image forming apparatus is in one of the first state and the second state.

Preferably, the control unit prohibits a user different from the user brought into correspondence with the identification information of the medium from using the function requiring the access to the medium among the functions of the image forming apparatus, in a case where the second determination unit determines that the identification information of the medium is stored in the second storage area while being brought into correspondence with the information about the user who logs in to the image forming apparatus.

Preferably, the image forming apparatus further includes: a fourth determination unit to determine a fact that the medium is removed from the image forming apparatus at the time when the user has logged in to the image forming apparatus, on the basis of a change in an insertion status of the medium into the image forming apparatus and a log-in status of the user to the image forming apparatus; and a deletion unit to delete the unique information of the medium from the first storage area and to delete, from the second storage area, the identification information of the medium stored while being brought into correspondence with the information about the user who logs in to the image forming apparatus, in response to a result of the determination by the fourth determination unit.

Preferably, the image forming apparatus further includes: a calculation unit to calculate the identification information of the medium from the unique information of the medium. Herein, the identification information of the medium is a hash code calculated from the unique information of the medium.

Preferably, the first storage area is formed in another apparatus, and the first storing unit includes a communication unit to carry out communications with the another apparatus. Also preferably, the second storage area is formed in another apparatus, and the second storing unit includes a communication unit to carry out communications with the another apparatus.

According to another aspect of the present invention, a method of controlling a medium in an image forming apparatus into and from which the medium can be inserted and removed includes the steps of: in a state where a user has logged in to the image forming apparatus and the medium is inserted into the image forming apparatus, storing unique information read out from the medium in a first storage area and storing identification information of the medium, obtained from the unique information, in a second storage area while bringing the identification information into correspondence with information about the user when the unique information is not stored in the first storage area; and in the state where the user has logged in to the image forming apparatus and the medium is inserted into the image forming apparatus, controlling permission/prohibition of use of a function requiring access to the medium among functions of the image forming apparatus when the unique information is stored in the first storage area and the identification information of the medium is stored in the second storage area while being brought into correspondence with the information about the user.

According to still another aspect of the present invention, a computer readable medium records a program causing the computer to serve as an image forming apparatus. Herein, the image forming apparatus has a medium insertable thereinto and removable therefrom. The program causes the computer to execute the steps of: in a state where a user has logged in to the image forming apparatus and the medium is inserted into the image forming apparatus, storing unique information read out from the medium in a first storage area and storing identification information of the medium, obtained from the unique information, in a second storage area while bringing the identification information into correspondence with information about the user when the unique information is not stored in the first storage area; and in the state where the user has logged in to the image forming apparatus and the medium is inserted into the image forming apparatus, controlling permission/prohibition of use of a function requiring access to the medium among functions of the image forming apparatus when the unique information is stored in the first storage area and the identification information of the medium is stored in the second storage area while being brought into correspondence with the information about the user.

According to the present invention, it is possible to appropriately prevent an unauthorized user from using a medium inserted into an image forming apparatus without complicated operation. Hence, it is possible to prevent leakage of data from the medium.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, description will be given of an embodiment of the present invention with reference to the drawings. In the following description, identical components and constituent elements are denoted by identical reference numerals, and designations and functions thereof are equal to each other.

An image forming apparatus according to the present invention corresponds to an MFP (Multi Function Peripheral) into which a removable recording medium (hereinafter, simply referred to as a "medium") can be inserted, or the like. Herein, examples of the medium include a USB (Universal Serial Bus) memory, and the like. Examples of the image forming apparatus include a copying machine, a printer, a complex machine functioning as a copying machine and a printer, and the like. It is assumed in this embodiment that the image forming apparatus is an MFP.

Figure 1:
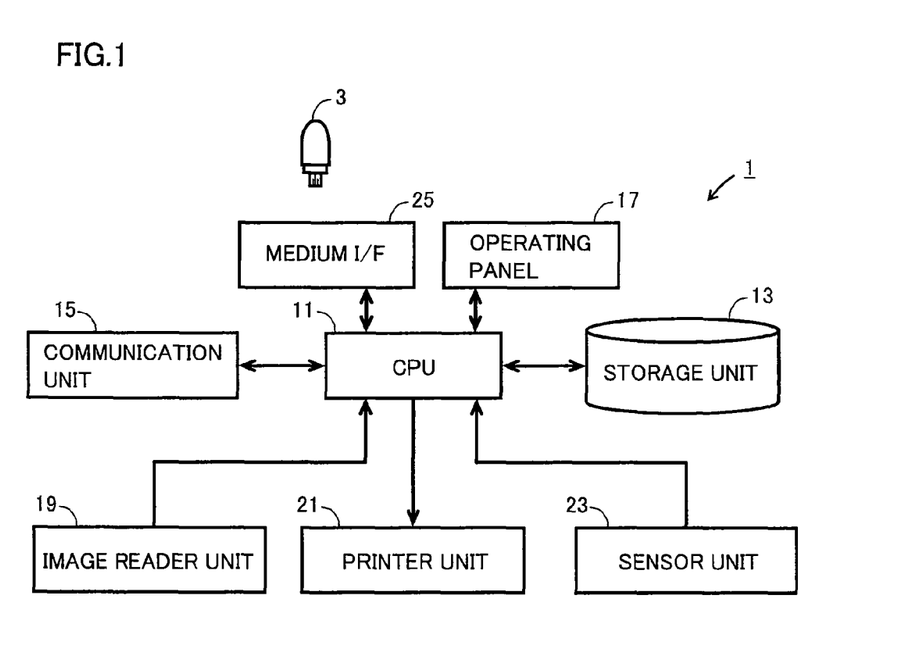
FIG. 1 is a block diagram showing a specific example of a hardware configuration of an MFP (Multi Function Peripheral) 1.

FIG. 1 is a block diagram showing a specific example of a hardware configuration of MFP 1 according to this embodiment. With reference to FIG. 1, MFP 1 includes a CPU (Central Processing Unit) 11, an image reader unit 19, a printer unit 21, a communication unit 15, a storage unit 13, an operating panel 17, a sensor unit 23 and a medium interface (hereinafter, referred to as a "medium I/F") 25. Herein, CPU 11 controls the entire apparatus. Image reader unit 19 reads image data from a document. Printer unit 21 prints an image on a sheet of paper. Communication unit 15 is used for connecting MFP 1 to the Internet or carrying out near wireless communications. Storage unit 13 takes a form of an HD (Hard Disk) or an RAM (Random Access Memory) and stores therein a job and a program such as a medium control program executed by CPU 11. Operating panel 17 serves as an interface between MFP 1 and a user. Sensor unit 23 detects a remaining quantity of consumable articles, and the like.

Medium I/F 25 is used for reading out data from medium 3 inserted into MFP 1 and writing data to medium 3.

Figure 2:
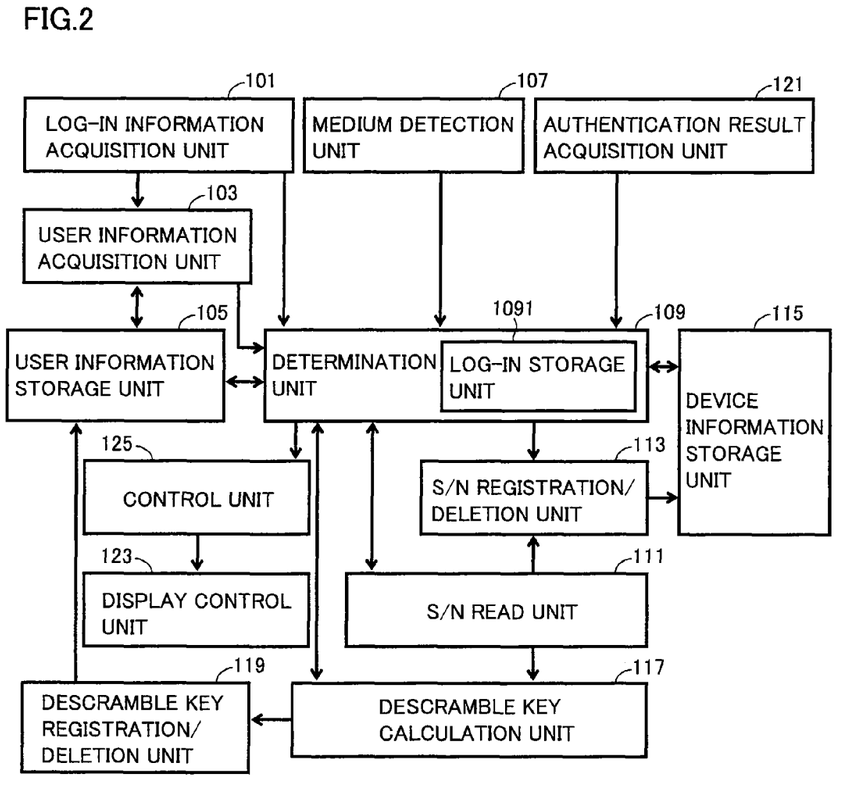
FIG. 2 is a block diagram showing a specific example of a functional configuration of MFP 1 for controlling use of a medium 3 in MFP 1.

FIG. 2 is a block diagram showing a specific example of a functional configuration of MFP 1 for controlling use of medium 3 in MFP 1. Each function shown in FIG. 2 is mainly realized in such a manner that CPU 11 executes a program stored in storage unit 13; however, part of the functions may be realized by hardware.

With reference to FIG. 2, the aforementioned functions of MFP 1 include a log-in information acquisition unit 101, a user information acquisition unit 103, a user information storage unit 105, a medium detection unit 107, a determination unit 109, a serial number read unit 111, a serial number registration/deletion unit 113, a device information storage unit 115, a descramble key calculation unit 117, a descramble key registration/deletion unit 119, an authentication result acquisition unit 121 and a display control unit 123.

User information storage unit 105 corresponds to a predetermined area in storage unit 13, and stores therein user information for each user. The user information contains information for identifying a relevant user, log-in information which is authentication information for log-in, and the like. It is assumed in this embodiment that the user identification information is specifically a user name; however, any other information may be used as long as it can identify the user. It is also assumed in this embodiment that the log-in information is specifically a password; however, any other information may be used as long as it can be used in authentication processing. Herein, the log-in information may contain the user identification information. In addition to the user identification information and the log-in information, the user information may further contain information for controlling use of MFP 1 by a relevant user. Specifically, the user information may contain information indicating permission/prohibition of use of the functions of MFP 1 by a relevant user, and information restricting the use of MFP 1, for example, information restricting the number of sheets of paper or information restricting a usable range of the functions of MFP 1.

Authentication result acquisition unit 121 acquires, from an authentication unit (not shown), a result of authentication using the log-in information. The authentication unit may be provided in MFP 1. In such a case, authentication result acquisition unit 121 acquires the authentication result from the authentication unit in MFP 1. Alternatively, the authentication unit may be provided in another apparatus such as an authentication server connected to MFP 1 through communication unit 15. In such a case, authentication result acquisition unit 121 acquires the authentication result from the aforementioned apparatus through communication unit 15. Authentication result acquisition unit 121 inputs to determination unit 109 a signal indicating the acquired authentication result.

Device information storage unit 115 corresponds to a predetermined area in storage unit 13, and stores therein a device information database in which information about a medium is registered. The information about the medium contains device information which is information unique to the medium. It is assumed in this embodiment that the device information is specifically a serial number of the medium. The serial number is stored in a predetermined area in the medium.

Log-in information acquisition unit 101 acquires the log-in information from an operation signal generated based on a log-in operation performed by the user through a log-in screen displayed on operating panel 17. Log-in information acquisition unit 101 transfers the acquired log-in information to user information acquisition unit 103. User information acquisition unit 103 retrieves the user information of the relevant user from user information storage unit 105 on the basis of the log-in information, and transfers the user information to determination unit 109. Herein, user information storage unit 105 may be provided in another apparatus such as a server connected to MFP 1 through communication unit 15. In such a case, user information acquisition unit 103 acquires the user information from the aforementioned apparatus through communication unit 15. Moreover, log-in information acquisition unit 101 detects an operation signal generated based on a log-out operation performed by the user through a log-out button displayed on operating panel 17 or detects a fact that a non-operating time counted by a timer (not shown) reaches a predetermined time. Thus, log-in information acquisition unit 101 detects a fact that MFP 1 is logged out. Then, log-in information acquisition unit 101 inputs to determination unit 109 a signal indicating the fact that MFP 1 is logged out.

Determination unit 109 includes a log-in storage unit 1091 serving as an area for storing therein a log-in status, and stores therein the log-in status of the user on the basis of the authentication result from authentication result acquisition unit 121 and the signal from log-in information acquisition unit 101.

Medium detection unit 107 monitors a signal inputted from medium I/F 25 to detect a change in an insertion status of medium 3 into MFP 1. More specifically, medium detection unit 107 detects a fact that medium 3 is inserted into MFP 1 and a fact that medium 3 is removed from MFP 1, and inputs to determination unit 109 a signal indicating a result of the detection.

On the basis of the result of the detection by medium detection unit 107 and the log-in status stored in log-in storage unit 1091, determination unit 109 determines whether or not MFP 1 is logged in at a time when medium 3 is inserted into MFP 1, whether or not medium 3 is inserted into MFP 1 at a time when MFP 1 is logged in, or whether or not MFP 1 is logged in at a time when medium 3 is removed from MFP 1. On the basis of a signal from serial number read unit 111 or a signal from descramble key calculation unit 117, determination unit 109 determines a first state, a second state or a third state (to be described later) in the state where MFP 1 is logged in at the time when medium 3 is inserted into MFP 1 or determines a fourth state, a fifth state or a sixth state (to be described later) in the state where medium 3 is inserted into MFP 1 at the time when MFP 1 is logged in.

Determination unit 109 inputs a signal indicating a result of the determination thereby to control unit 125, serial number read unit 111, descramble key calculation unit 117, serial number registration/deletion unit 113, descramble key registration/deletion key 119 and the like in response to the result of the determination. Further, determination unit 109 transfers the user information to serial number registration/deletion unit 113 in response to the result of the determination.

In accordance with the signal indicating the result of the determination by determination unit 109, serial number read unit 111 reads a serial number stored in medium 3 inserted into MFP 1, and inputs to determination unit 109 a signal indicating the serial number. Moreover, serial number read unit 111 transfers the serial number to serial number registration/deletion unit 113 or descramble key calculation unit 117 in accordance with the signal indicating the result of the determination by determination unit 109.

In accordance with the signal indicating the result of the determination by determination unit 109, serial number registration/deletion unit 113 brings the serial number of medium 3 into correspondence with the user information to register the serial number in the device information database.

In accordance with the signal indicating the result of the determination by determination unit 109, alternatively, serial number registration/deletion unit 113 deletes the serial number registered in the device information database. Herein, the operation of bringing the serial number into correspondence with the user information to register the serial number may be an operation of registering, as information about a medium, a pair of a serial number serving as device information of the medium and user information in the device information database, or may be another registration method.

In accordance with the signal indicating the result of the determination by determination unit 109, descramble key calculation unit 117 calculates a descramble key from the serial number of medium 3, and inputs to determination unit 109 a signal indicating the descramble key. The descramble key is information for identifying medium 3 and is uniquely derived from the information unique to medium 3. Specifically, the descramble key may be a hash code calculated from the serial number of medium 3 or may be another identification information calculated from a function. Alternatively, the descramble key may be the serial number itself. A method for calculating the descramble key by descramble key calculation unit 117 is not limited to a specific method in the present invention.

In accordance with the signal indicating the result of the determination by determination unit 109, descramble key calculation unit 117 transfers the calculated descramble key to descramble key registration/deletion unit 119. In accordance with the signal indicating the result of the determination by determination unit 109, descramble key registration/deletion unit 119 brings the descramble key into correspondence with the user information to register the descramble key in user information storage unit 105. In accordance with the signal indicating the result of the determination by determination unit 109, alternatively, descramble key registration/deletion unit 119 deletes the descramble key which is registered in user information storage unit 105 while being brought into correspondence with the user information. Herein, the operation of bringing the descramble key into correspondence with the user information to register the descramble key may be an operation of adding the descramble key to the user information, may be an operation of storing in user information storage unit 105 a pair of the user identification information or the log-in information contained in the user information and the descramble key, or may be another registration method.

In accordance with the signal indicating the result of the determination by determination unit 109, control unit 125 restricts access to medium 3 inserted into MFP 1. In accordance with the signal indicating the result of the determination by determination unit 109, specifically, control unit 125 outputs a control signal to display control unit 123 so as to cause operating panel 17 to display a screen in response to the determined state. In accordance with the signal indicating the result of the determination by determination unit 109, moreover, control unit 125 outputs to medium I/F 25 a control signal for restricting access to medium 3.

In accordance with the control signal from control unit 125, display control unit 123 generates a control signal so as to cause operating panel 17 to display a screen in response to the state determined by determination unit 109, and outputs the control signal to operating panel 17.

Herein, all of the functions shown in FIG. 2 may not be necessarily provided in MFP 1. For example, if MFP 1 carries out communications with another apparatus such as a control server through communication unit 15, some of the functions shown in FIG. 2 may be provided in the aforementioned apparatus. MFP 1 may be configured to transmit a required signal to the aforementioned apparatus, to receive a signal indicating a result of determination or a control signal from the aforementioned apparatus and to function on the basis of the received signal.

Figure 3:
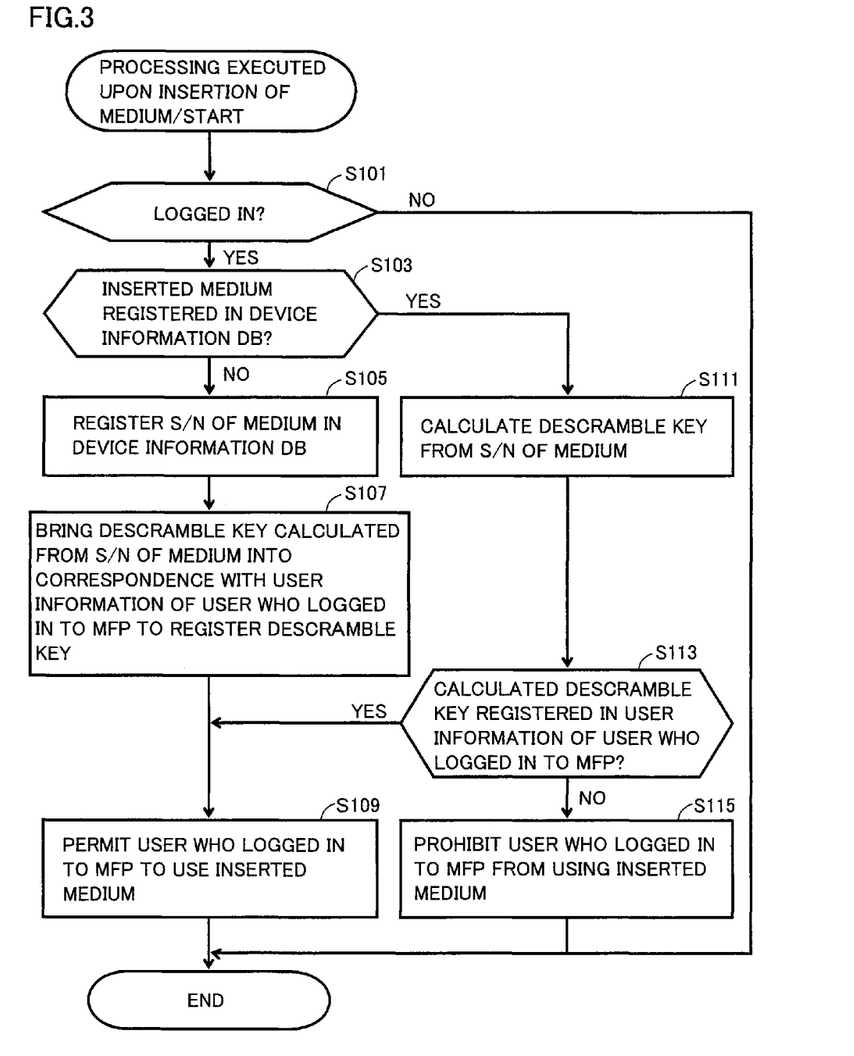
FIG. 3 is a flowchart showing processing executed when medium 3 is inserted into MFP 1.
Figure 4:
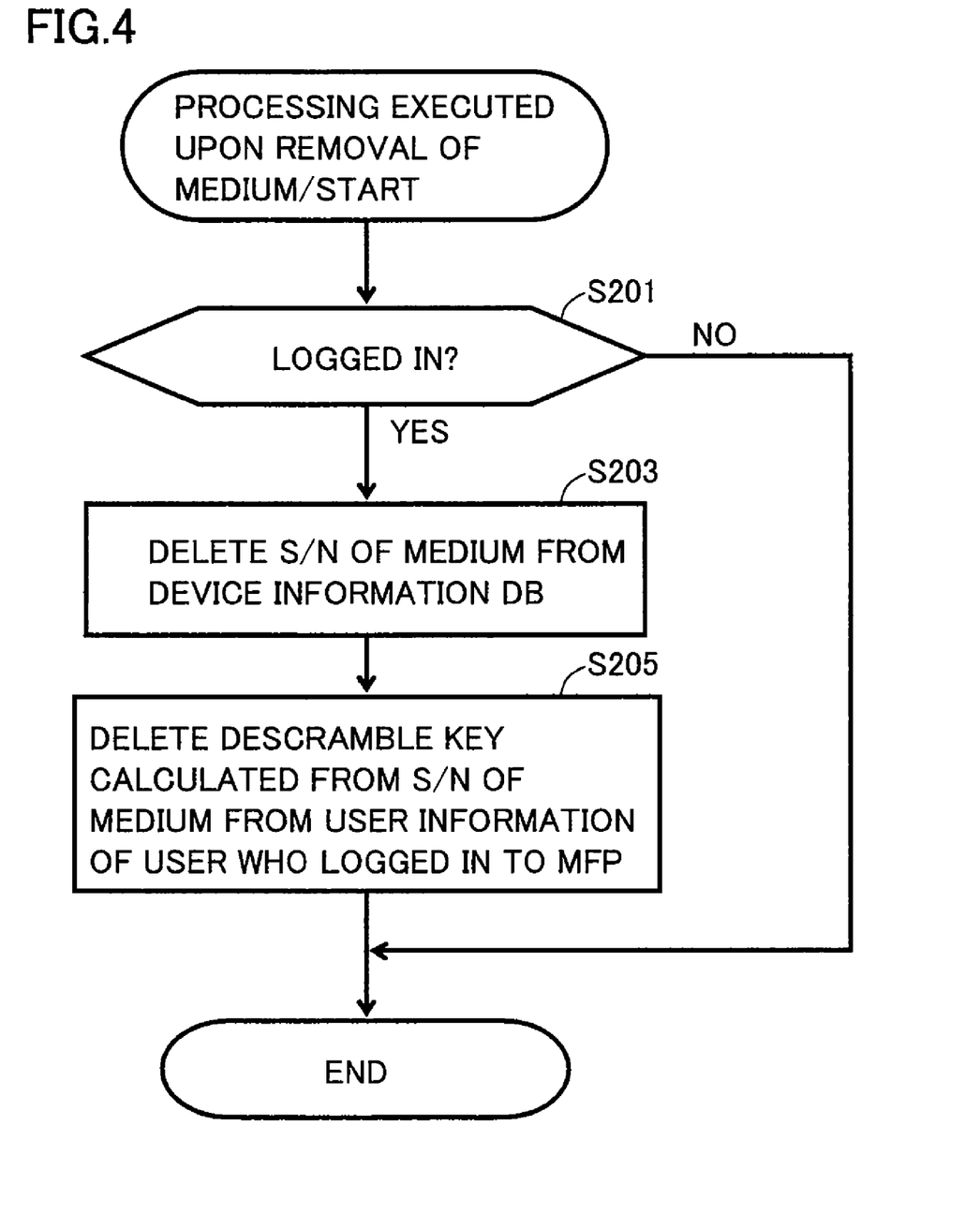
FIG. 4 is a flowchart showing processing executed when medium 3 is removed from MFP 1.
Figure 5:
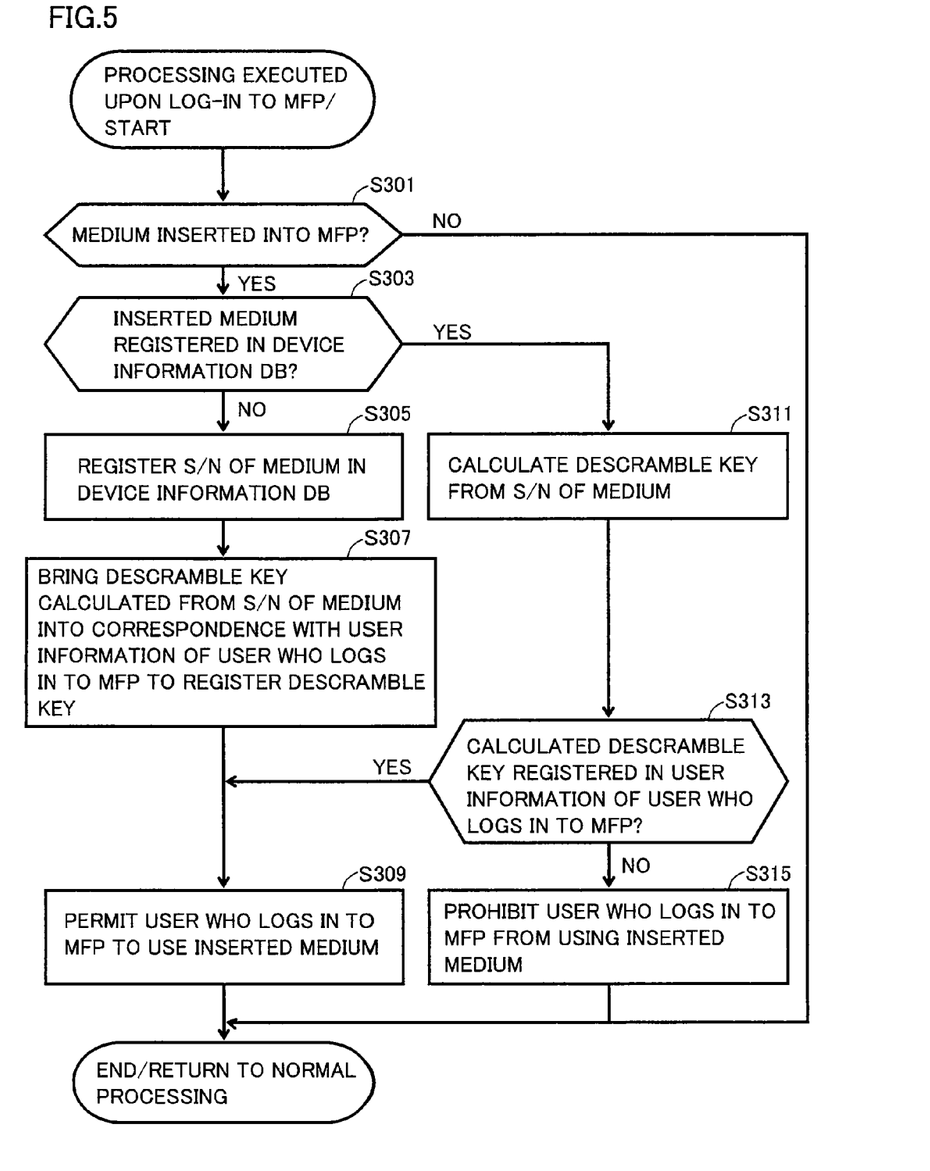
FIG. 5 is a flowchart showing processing executed when a user logs in to MFP 1.

When medium 3 is inserted into MFP 1, when medium 3 is removed from MFP 1 and when a user logs in to MFP 1, MFP 1 executes processing for controlling the use of medium 3 inserted thereinto, as shown in FIGS. 3, 4 and 5, respectively.

(Upon Insertion of Medium)

FIG. 3 is a flowchart showing processing executed when medium 3 is inserted into MFP 1. The processing shown in the flowchart of FIG. 3 is started when medium detection unit 107 detects insertion of medium 3, is executed in such a manner that CPU 11 reads out a program stored in storage unit 13, and is realized in such a manner that the respective functions shown in FIG. 2 are exerted.

With reference to FIG. 3, first, determination unit 109 determines whether or not MFP 1 is logged in at the time when medium detection unit 107 detects the insertion of medium 3 (step S101). In step S101, more specifically, determination unit 109 determines whether or not MFP 1 requires execution of subsequent processing for controlling use of medium 3. If determination unit 109 determines that MFP 1 is not logged in at the time when medium detection unit 107 detects the insertion of medium 3 (NO in step S101), then determination unit 109 determines that MFP 1 does not require execution of the subsequent processing for controlling the use of medium 3, and the processing is completed.

On the other hand, if determination unit 109 determines that MFP 1 is logged in at the time when medium detection unit 107 detects the insertion of medium 3 (YES in step S101), then determination unit 109 determines that MFP 1 requires execution of the subsequent processing for controlling the use of medium 3. Further, determination unit 109 determines whether or not the serial number read from medium 3 by serial number read unit 111 is registered in the device information database (step S103).

Herein, if determination unit 109 determines that MFP 1 is logged in at the time when medium 3 is inserted into MFP 1 and the serial number of medium 3 is not registered in the device information database, that is, determines that MFP 1 is in the "first state" (YES in step S101 and NO in step S103), then serial number registration/deletion unit 113 brings the serial number of medium 3 into correspondence with the user information of the user who logs in to MFP 1 to register the serial number in the device information database (step S105). Further, descramble key registration/deletion unit 119 brings the descramble key calculated from the serial number of medium 3 by descramble key calculation unit 117 into correspondence with the user information of the user who logs in to MFP 1 to register the descramble key in user information storage unit 105 (step S107). Specifically, it is assumed herein that the descramble key calculated from the serial number of medium 3 is added to the user information of the user who logs in to MFP 1. In this state, control unit 125 permits the user who logs in to MFP 1 to use medium 3 (step S109). In step S109, specifically, control unit 125 does not output to medium I/F 25 the control signal for restricting the access to medium 3. Moreover, control unit 125 outputs the control signal to display control unit 123 so as to cause operating panel 17 to display a screen indicating a state where medium 3 is usable.

Herein, the "first state" corresponds to the state where medium 3 is inserted into MFP 1 at the time when the user logs in to MFP 1.

If determination unit 109 determines that MFP 1 is logged in at the time when medium 3 is inserted into MFP 1 and that the serial number of medium 3 is registered in the device information database (YES in step S101 and YES in step S103), further, determination unit 109 determines that the descramble key calculated by descramble key calculation unit 117 in step S111 is registered in user information storage unit 105 while being brought into correspondence with the user information of the user who logs in to MFP 1, that is, determines that MFP 1 is in the "second state" (YES in step SI 13), then control unit 125 permits the user who logs in to MFP 1 to use medium 3 (step S109), as in the case where determination unit 109 determines that MFP 1 is in the first state.

Herein, the "second state" corresponds to a state where medium 3 is temporarily removed from MFP 1 at the time when the user has logged in to MFP 1 and, then, medium 3 is inserted into MFP 1 at the time when the user has still logged in to MFP 1.

If determination unit 109 determines that MFP 1 is logged in at the time when medium 3 is inserted into MFP 1 and that the serial number of medium 3 is registered in the device information database (YES in step S101 and YES in step S103), further, determination unit 109 determines that the descramble key brought into correspondence with the user information of the user who logs in to MFP 1 is not registered in user information storage unit 105, that is, determines that MFP 1 is in the "third state" (NO in step S113), then control unit 125 prohibits the user who logs in to MFP 1 from using medium 3 (step S115). In step S115, specifically, control unit 125 outputs to medium I/F 25 the control signal for restricting the access to medium 3. Moreover, control unit 125 outputs the control signal to display control unit 123 so as to cause operating panel 17 to display a screen indicating a state where medium 3 is unusable.

Herein, the "third state" corresponds to a state where medium 3 is temporarily removed from MFP 1 at the time when the user logs in to MFP 1 and, then, medium 3 is inserted into MFP 1 at the time when another user logs in to MFP 1.

Note that the processing shown in FIG. 3 may be started at the time when MFP 1 accepts a user operation of selecting, as a function to be executed, the function requiring the access to medium 3 (for example, the function of printing out the database in medium 3), in place of (or in addition to) the detection of the insertion of medium 3.

(Upon Removal of Medium)

FIG. 4 is a flowchart showing processing executed when medium 3 is removed from MFP 1. The processing shown in the flowchart of FIG. 4 is started when medium detection unit 107 detects removal of medium 3, is executed in such a manner that CPU 11 reads out a program stored in storage unit 13, and is realized in such a manner that the respective functions shown in FIG. 2 are exerted.

With reference to FIG. 4, if determination unit 109 determines that MFP 1 is logged in at the time when medium detection unit 107 detects the removal of medium 3 (YES in step S201), then serial number registration/deletion unit 113 deletes the serial number of medium 3 from the device information database (step S203). In addition, descramble key registration/deletion unit 119 deletes the descramble key calculated from the serial number of medium 3, from the user information of the user who logs in to MFP 1 (step S205).

(Upon Log-In to MFP)

FIG. 5 is a flowchart showing processing executed when the user logs in to MFP 1. The processing shown in the flowchart of FIG. 5 is started when authentication result acquisition unit 121 acquires the authentication result from the authentication unit, is executed in such a manner that CPU 11 reads out a program stored in storage unit 13, and is realized in such a manner that the respective functions shown in FIG. 2 are exerted. Specifically, a log-in screen (not shown) is displayed on operating panel 17. When the user inputs a user name and a password to the screen and presses a log-in button, the processing shown in FIG. 5 is started.

With reference to FIG. 5, first, when the user logs in to MFP 1, determination unit 109 determines whether or not medium 3 is inserted into MFP 1, on the basis of the signal from medium detection unit 107 (step S301). In step S301, specifically, determination unit 109 determines whether or not MFP 1 requires execution of subsequent processing for controlling use of medium 3. If determination unit 109 determines that medium 3 is not inserted into MFP 1 at the time when the user logs in to MFP 1 (NO in step S301), then determination unit 109 determines that MFP 1 does not require execution of the subsequent processing for controlling the use of medium 3, and the processing is completed.

If determination unit 109 determines that medium 3 is inserted into MFP 1 at the time when the user logs in to MFP 1 (YES in step S301), then determination unit 109 determines that MFP 1 requires execution of the subsequent processing for controlling the use of medium 3. Further, determination unit 109 determines whether or not the serial number read from medium 3 by serial number read unit 111 is registered in the device information database (step S303).

If determination unit 109 determines that medium 3 is inserted into MFP 1 at the time when the user logs in to MFP 1 and that the serial number of medium 3 is not registered in the device information database, that is, determines that MFP 1 is in the "fourth state" (YES in step S301 and NO in step S303), then serial number registration/deletion unit 113 brings the serial number of medium 3 into correspondence with the user information of the user who logs in to MFP 1 to register the serial number in the device information database (step S305). Further, descramble key registration/deletion unit 119 brings the descramble key calculated from the serial number of medium 3 by descramble key calculation unit 117 into correspondence with the user information of the user who logs in to MFP 1 to register the descramble key in user information storage unit 105 (step S307). Specifically, it is also assumed herein that the descramble key calculated from the serial number of medium 3 is added to the user information of the user who logs in to MFP 1. In this state, control unit 125 permits the user who logs in to MFP 1 to use medium 3 (step S309). In step S309, specifically, control unit 125 does not output to medium I/F 25 the control signal for restricting the access to medium 3. Moreover, control unit 125 outputs the control signal to display control unit 123 so as to cause operating panel 17 to display the screen indicating the state where medium 3 is usable.

Herein, the "fourth state" corresponds to a state where the user logs in to MFP 1 into which medium 3 is already inserted and medium 3 is brought into correspondence with no user at the time when the user logs in to MFP 1 (that is, no user uses medium 3).

If determination unit 109 determines that medium 3 is inserted into MFP 1 at the time when MFP 1 is logged in and that the serial number of medium 3 is registered in the device information database (YES in step S301 and YES in step S303), further, determination unit 109 determines that the descramble key calculated by descramble key calculation unit 117 in step S311 is registered in user information storage unit 105 while being brought into correspondence with the user information of the user who logs in to MFP 1, that is, determines that MFP 1 is in the "fifth state" (YES in step S313), then control unit 125 permits the user who logs in to MFP 1 to use medium 3 (step S309), as in the case where determination unit 109 determines that MFP 1 is in the fourth state.

Herein, the "fifth state" corresponds to a state where a user who logs in to MFP 1 inserts medium 3 into MFP 1 for use, but logs out from MFP 1 without removing medium 3 from MFP 1 and, thereafter, logs in to MFP 1, into which medium 3 is still inserted, again.

If determination unit 109 determines that medium 3 is inserted into MFP 1 at the time when MFP 1 is logged in and that the serial number of medium 3 is registered in the device information database (YES in step S301 and YES in step S303), further, determination unit 109 determines that the descramble key brought into correspondence with the user information of the user who logs in to MFP 1 is not registered in user information storage unit 105, that is, determines that MFP 1 is in the "sixth state" (NO in step S313), then control unit 125 prohibits the user who logs in to MFP 1 from using medium 3 (step S315). In step S315, specifically, control unit 125 outputs to medium I/F 25 the control signal for restricting the access to medium 3. Moreover, control unit 125 outputs the control signal to display control unit 123 so as to cause operating panel 17 to display the screen indicating the state where medium 3 is unusable.

Herein, the "sixth state" corresponds to a state where a first user who logs in to MFP 1 inserts medium 3 into MFP 1 for use, but logs out from MFP 1 without removing medium 3 from MFP 1 and, thereafter, a second user logs in to MFP 1 into which medium 3 of the first user is still inserted.

Note that the processing shown in FIG. 5 may be started at the time when MFP 1, which has been logged in, accepts a user operation of selecting, as a function to be executed, the function requiring the access to medium 3 (for example, the function of printing out the database in medium 3), in place of (or in addition to) the log-in to MFP 1.

Figure 6:
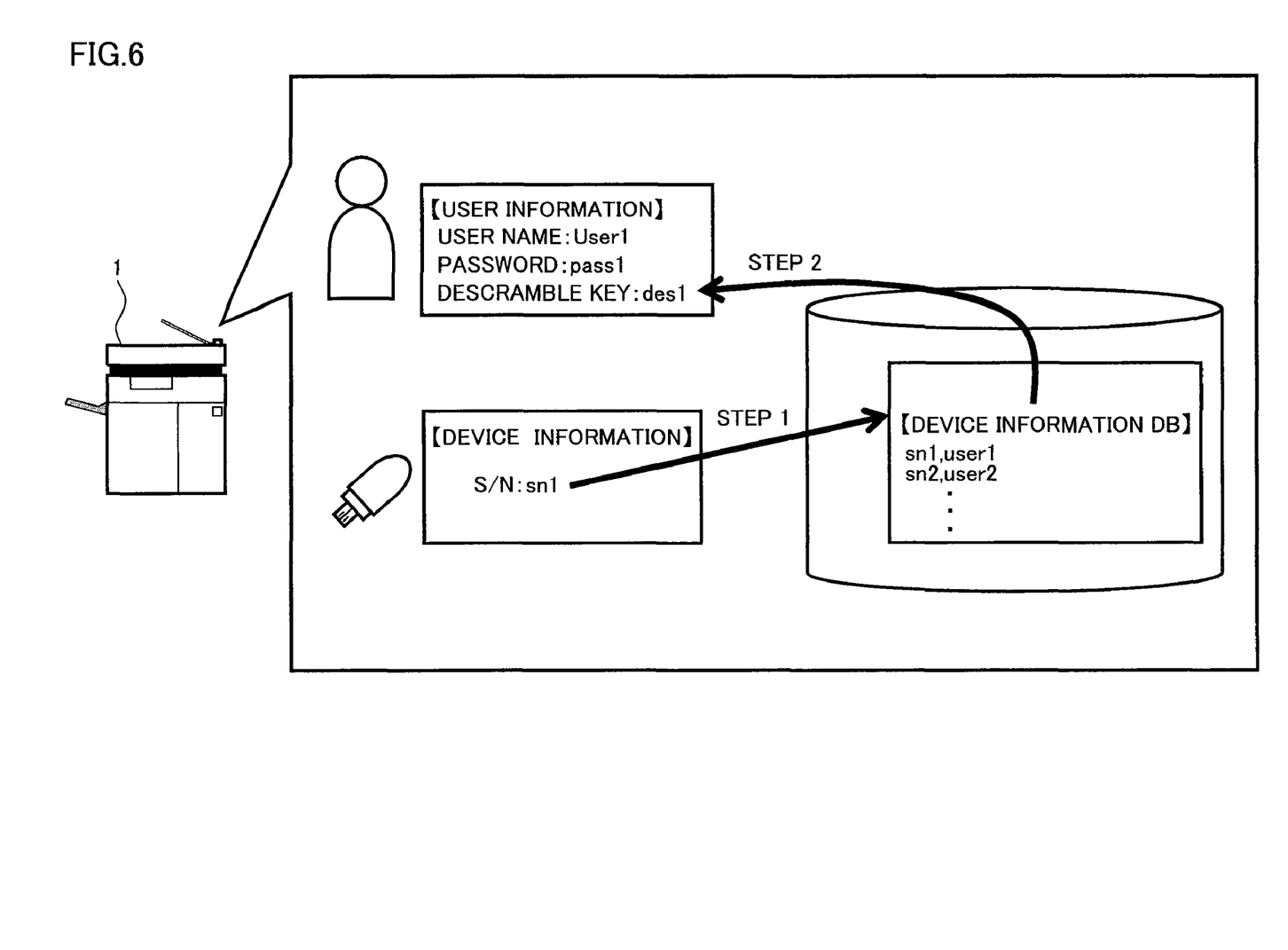
FIG. 6 shows a flow of registering, in MFP 1, device information of medium 3.

The aforementioned processing is executed on MFP 1 according to this embodiment, so that the use of medium 3 inserted into MFP 1 is controlled as follows. FIG. 6 used in the following description shows a flow of registering the device information of medium 3 in MFP 1.

Figure 7A:
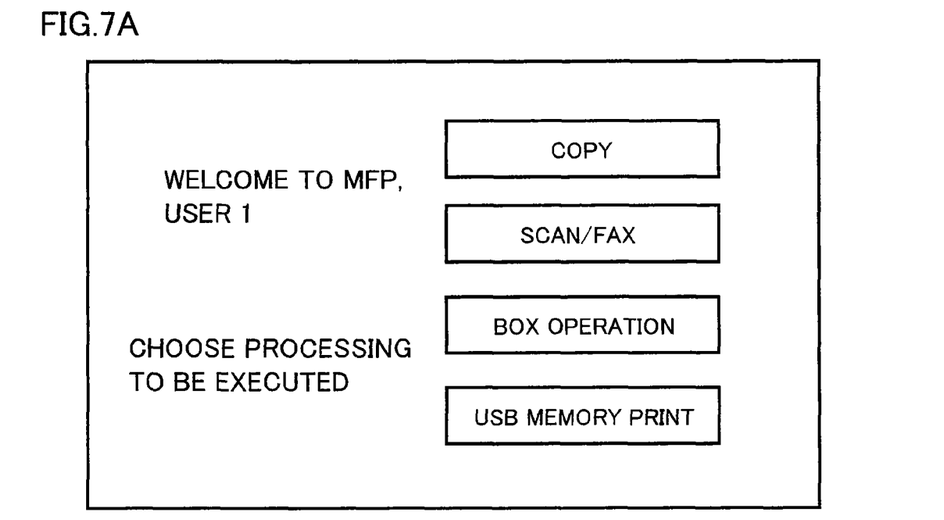
FIGS. 7A and 7B show specific examples of a display screen.

When the first user logs in to MFP 1 and inserts medium 3 into MFP 1, MFP 1 detects the "first state". With reference to FIG. 6, herein, the serial number of medium 3 is stored in the device information database while being brought into correspondence with user information of the first user in step S105 (STEP 1 in FIG. 6). Further, the descramble key of medium 3 is registered in the user information of the first user in step S107 (STEP 2 in FIG. 6). Thus, the first user can use medium 3 in MFP 1. Herein, operating panel 17 displays the screen indicating the state where medium 3 is usable in step S109, as shown in FIG. 7A. Specifically, the screen shown in FIG. 7A provides the user with the processing requiring access to medium 3 in MFP 1 (herein, "USB memory print") as selectable processing.

Alternatively, when the first user inserts medium 3 into MFP 1 and, then, logs in to MFP 1, MFP 1 detects the "fourth state". Also herein, the serial number of medium 3 is stored in the device information database while being brought into correspondence with user information of the first user in step S305 (STEP 1 in FIG. 6). Further, the descramble key of medium 3 is registered in the user information of the first user in step S307 (STEP 2 in FIG. 6). Thus, the first user can use medium 3 in MFP 1. Herein, operating panel 17 displays the screen indicating the state where medium 3 is usable in step S309, as shown in FIG. 7A.

Next, when the first user removes medium 3 from MFP 1 which is still logged in, the serial number of medium 3 is deleted from the device information database in step S203. Further, the descramble key of medium 3 is deleted from the user information of the first user in step S205.

The foregoing description applies to a normal case where the first user inserts medium 3 into MFP 1, which is already logged in, for use, and then removes medium 3 from MFP 1 after the use. Alternatively, the foregoing description applies to a case where the first user logs in to MFP 1 after insertion of medium 3 into MFP 1, and then removes medium 3 from MFP 1 which is still logged in. In this case, MFP 1 having medium 3 inserted thereinto permits the first user to use medium 3 and, if medium 3 is removed from MFP 1, the registration of medium 3 is deleted from MFP 1.

Figure 7B:
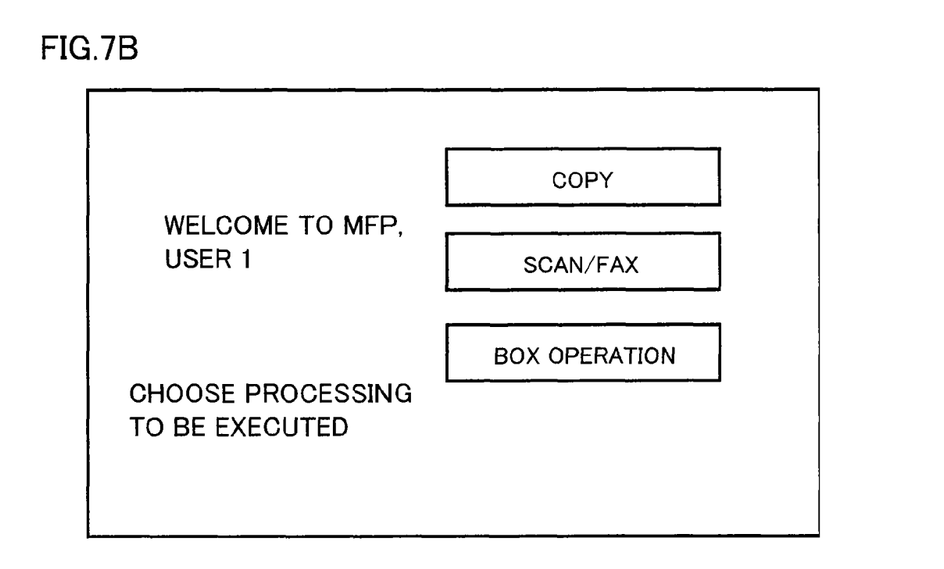

It is assumed herein that the first user logs out from MFP 1 without removing medium 3 from MFP 1. Next, even when the second user newly logs in to MFP 1 and, then, removes medium 3 from MFP 1, the descramble key of medium 3 is not registered in the user information of the second user; therefore, the descramble key is not deleted from the user information. In other words, even when the first user logs out from MFP 1 without removing medium 3 from MFP 1, the descramble key of medium 3 is still registered in the user information of the first user. Therefore, when the first user logs out from MFP 1 without removing medium 3 from MFP 1, and then the second user newly logs in to MFP 1 into which medium 3 is still inserted, MFP 1 detects the "sixth state". Thus, the use of medium 3 by the second user is prohibited in step S315. Herein, operating panel 17 displays the screen indicating the state where medium 3 is unusable, as shown in FIG. 7B. Specifically, the screen shown in FIG. 7B does not provide the user with the processing requiring access to medium 3 in MFP 1 ("USB memory print" in FIG. 7A) as selectable processing, but provides the user with only processing requiring no access to medium 3 in MFP 1 as selectable processing.

Alternatively, when the first user logs out from MFP 1 without removing medium 3 from MFP 1 and, then, temporarily removes medium 3 from MFP 1, and the second user logs in to MFP 1 and, then, inserts medium 3 into MFP 1, MFP 1 detects the "third state". Also herein, the use of medium 3 by the second user is prohibited in step S115, and operating panel 17 displays the screen indicating the state where medium 3 is unusable, as shown in FIG. 7B.

The foregoing description applies to a case where the first user who is an authorized user of medium 3 forgets to remove medium 3 from MFP 1 and the second user who is an unauthorized user of medium 3 intends to use medium 3 in MFP 1. In this case, the information about the first user and the information about medium 3 are registered in MFP 1 while being brought into correspondence with each other upon use of medium 3 by the first user; therefore, use of medium 3 by the second user is prohibited in MFP 1. Thus, it is possible to prevent unauthorized use of medium 3. As a result, it is possible to prevent the data of the first user from being unintentionally acquired by the second user.

When the first user logs out from MFP 1 without removing medium 3 from MFP 1 and, then, logs in to MFP 1, into which medium 3 is still inserted, again, MFP 1 detects the "fifth state". In the fifth state, the first user can use medium 3 in step S309. In step S309, operating panel 17 displays the screen indicating the state where medium 3 is usable, as shown in FIG. 7A.

Alternatively, when the first user temporarily removes medium 3 from MFP 1 which is still logged in and, then, inserts medium 3 into MFP 1 again, MFP 1 detects the "second state". In the second state, the first user can use medium 3 in step S109. In step S109, operating panel 17 displays the screen indicating the state where medium 3 is usable, as shown in FIG. 7A.

The foregoing description applies to a case where the first user who is an authorized user of medium 3 uses medium 3 again. In this case, the information about the first user and the information about medium 3 are registered in MFP 1 while being brought into correspondence with each other upon use of medium 3 by the first user; thus, MFP 1 permits the first user, who logs in to MFP 1 again or who inserts medium 3 into MFP 1 again, to use medium 3. Therefore, the authorized user can use medium 3 without fail. In addition, the first user who is the authorized user does not necessarily to perform an authorizing operation for use of medium 3 again. Thus, it is possible to prevent usability from becoming deteriorated when the use of medium 3 is authorized.

The present invention can also provide a program for causing a computer to execute processing which realizes the method of controlling medium 3 in MFP 1. Such a program can be provided as a program product while being recorded on a computer readable medium such as a flexible disk attached to a computer, a CD-ROM (Compact Disk-Read Only Memory), an ROM (Read Only Memory), an RAM (Random Access Memory) or a memory card. Alternatively, such a program can be provided while being recorded on a medium such as a hard disk in a computer. Still alternatively, such a program can be provided by a download via a network.

The program according to the present invention may be configured as follows. That is, processing is executed in such a manner that required one of program modules provided as part of an operation system (OS) in a computer is called in a predetermined arrangement at a predetermined timing. In such a case, the program itself contains no modules, and the processing is executed in cooperation with the OS. The program containing no modules is also included in the program according to the present invention.

Alternatively, the program according to the present invention may be provided while being incorporated into part of another program. Also in such a case, the program itself contains no modules to be contained in the another module, and processing is executed in cooperation with the another program. The program incorporated into the another program is also included in the program according to the present invention.

The program product to be provided in the present invention is executed while being installed on a program storage unit such as a hard disk. Herein, the program product includes a program itself, and a recording medium recording thereon the program.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
a read unit to read unique information from a medium inserted into said image forming apparatus;
a first storing unit to store said unique information of said medium in a first storage area;
a first determination unit to determine whether or not said unique information of said medium is stored in said first storage area when a user has logged in to said image forming apparatus and said medium is inserted into said image forming apparatus;
a second storing unit to store identification information of said medium, which is obtained from said unique information of said medium, in a second storage area while bringing said identification information into correspondence with information about the user who has logged in to said image information apparatus, in response to a result of the determination by said first determination unit;
a second determination unit to determine whether or not said identification information of said medium is stored in said second storage area while being brought into correspondence with the information about said user who has logged in to said image forming apparatus, when said first determination unit determines that said unique information of said medium is stored in said first storage area; and
a control unit to control permission/prohibition of use of a function requiring access to said medium among functions of said image forming apparatus, in response to a result of the determination by said second determination unit, said control unit prohibits a user different from said user brought into correspondence with said identification information of said medium from using the function requiring the access to said medium among the functions of said image forming apparatus, in a case where said second determination unit determines that said identification information of said medium is stored in said second storage area while being brought into correspondence with the information about said user who has logged in to said image forming apparatus.

2. The image forming apparatus according to claim 1, further comprising:
a detection unit to detect a change in an insertion status of said medium into said image forming apparatus; and
a third determination unit to determine one of a first state where said user has logged in to said image forming apparatus at a time when said medium is inserted into said image forming apparatus and a second state where said medium has been inserted into said image forming apparatus at a time when said user logs in to said image forming apparatus, on the basis of the change in the insertion status of said medium and a log-in status of the user to said image forming apparatus, wherein
said first determination unit determines whether or not said unique information of said medium is stored in said first storage area in a case where said third determination unit determines that said image forming apparatus is in one of said first state and said second state.

3. The image forming apparatus according to claim 1, further comprising:
a fourth determination unit to determine a fact that said medium is removed from said image forming apparatus at the time when said user has logged in to said image forming apparatus, on the basis of a change in an insertion status of said medium into said image forming apparatus and a log-in status of said user to said image forming apparatus; and
a deletion unit to delete said unique information of said medium from said first storage area and to delete, from said second storage area, said identification information of said medium stored while being brought into correspondence with the information about said user who has logged in to said image forming apparatus, in response to a result of the determination by said fourth determination unit.

4. The image forming apparatus according to claim 1, further comprising:

a calculation unit to calculate said identification information of said medium from said unique information of said medium, wherein
said identification information of said medium is a hash code calculated from said unique information of said medium.

5. The image forming apparatus according to claim 1, wherein
said first storage area is formed in another apparatus, and
said first storing unit includes a communication unit to carry out communications with said another apparatus.

6. The image forming apparatus according to claim 1, wherein
said second storage area is formed in another apparatus, and
said second storing unit includes a communication unit to carry out communications with said another apparatus.

7. A method of controlling a medium in an image forming apparatus into and from which said medium can be inserted and removed, said method comprising the steps of:
when a user has logged in to said image forming apparatus and said medium is inserted into said image forming apparatus, determining whether or not unique information read from said medium is stored in a first storage area;
when said unique information read from said medium is not stored in said first storage area, storing said unique information read from said medium, in said first storage area;
storing identification information of said medium, which is obtained from said unique information, in a second storage area while bringing said identification information into correspondence with information about said user;
when said user has logged in to said image forming apparatus, said medium is inserted into said image forming apparatus, and said unique information read from said medium is stored in said first storage area, determining whether or not said identification information of said medium is stored in said second storage area while being brought into correspondence with said information about said user who has logged in to said image forming apparatus; and
controlling permission/prohibition of use a function requiring access to said medium among functions of said image forming apparatus, in response to a result of the determination as to whether or not said identification information of said medium is stored in said second storage area while being brought into correspondence with said user who has logged in to said image forming apparatus, said controlling prohibiting a user different from said user brought into correspondence with said identification information of said medium from using the function requiring the access to said medium among the functions of said image forming apparatus, in a case where it is determined that said identification information of said medium is stored in said second storage area while being brought into correspondence with the information about said user who has logged in to said image forming apparatus.

8. A computer readable medium recording a program causing said computer to serve as an image forming apparatus, wherein
said image forming apparatus has a medium insertable thereinto and removable therefrom, and
said program causes said computer to execute the steps of:
when a user has logged in to said image forming apparatus and said medium is inserted into said image forming apparatus, determining whether or not unique information read from said medium is stored in a first storage area;
when said unique information read from said medium is not stored in said first storage area, storing said unique information read from said medium, in said first storage area;
storing identification information of said medium, which is obtained from said unique information, in a second storage area while bringing said identification information into correspondence with information about said user;
when said user has logged in to said image forming apparatus, said medium is inserted into said image forming apparatus, and said unique information read from said medium is stored in said first storage area, determining whether or not said identification information of said medium is stored in said second storage area while being brought into correspondence with said information about said user who has logged in to said image forming apparatus; and
controlling permission/prohibition of use a function requiring access to said medium among functions of said image forming apparatus, in response to a result of the determination as to whether or not said identification information of said medium is stored in said second storage area while being brought into correspondence with said user who has logged in to said image forming apparatus, said controlling prohibiting a user different from said user brought into correspondence with said identification information of said medium from using the function requiring the access to said medium among the functions of said image forming apparatus, in a case where it is determined that said identification information of said medium is stored in said second storage area while being brought into correspondence with the information about said user who has logged in to said image forming apparatus.

* * * * *